United States Patent (10) Patent No.: US 8,231,168 B2
Toyozumi et al. (45) Date of Patent: Jul. 31, 2012

(54) ARRANGING STRUCTURE OF WIRE HARNESS FOR DOOR

(75) Inventors: Morihiko Toyozumi, Yokkaichi (JP); Isao Tsuji, Yokkaichi (JP); Daiki Nagayasu, Yokkaichi (JP); Tsutomu Sakata, Yokkaichi (JP); Tetsuya Fujita, Yokkaichi (JP); Sung-Jin Kim, Yokkaichi (JP)

(73) Assignee: Sumitomo Wiring Sytems, Ltd., Mie (JP)

( * ) Notice: Subject to any disclaimer, the term of this patent is extended or adjusted under 35 U.S.C. 154(b) by 426 days.

(21) Appl. No.: 12/517,628

(22) PCT Filed: Jul. 2, 2007
(Under 37 CFR 1.47)

(86) PCT No.: PCT/JP2007/063250
§ 371 (c)(1),
(2), (4) Date: Jan. 28, 2010

(87) PCT Pub. No.: WO2008/068919
PCT Pub. Date: Jun. 12, 2008

(65) Prior Publication Data
US 2010/0264687 A1 Oct. 21, 2010

(30) Foreign Application Priority Data
Dec. 6, 2006 (JP) ................................. 2006-329804

(51) Int. Cl.
*B60R 16/027* (2006.01)
*H02G 11/00* (2006.01)
(52) U.S. Cl. ...... 296/208; 49/167; 174/72 A; 296/146.9; 439/34
(58) Field of Classification Search ............ 49/167, 49/502; 174/68.3, 69, 72 A, 86, 87; 296/146.1, 296/146.7, 146.9; 361/826; 439/34, 207
See application file for complete search history.

(56) References Cited

U.S. PATENT DOCUMENTS

| 4,882,842 A | * | 11/1989 | Basson et al. ................. 29/857 |
| 4,907,836 A | * | 3/1990 | Ueda et al. .................. 296/39.1 |
| 5,487,680 A | * | 1/1996 | Yamanashi .................. 439/552 |
| 5,879,047 A | | 3/1999 | Yamaguchi et al. |

(Continued)

FOREIGN PATENT DOCUMENTS
JP 07156725 A * 6/1995
(Continued)

OTHER PUBLICATIONS
English language Abstract of JP 2006-117054, May 11, 2006.
(Continued)

*Primary Examiner* — Glenn Dayoan
*Assistant Examiner* — Paul Chenevert
(74) *Attorney, Agent, or Firm* — Greenblum & Bernstein P.L.C.

(57) ABSTRACT

In an arranging structure of a wire harness for a door, the wire harness is spanned between a door of a motor vehicle and a vehicle body at an indoor side inside of a weather strip. The wire harness is drawn out from a space between a door inner panel and a door trim at the door side and is provided with an excess length portion that follows opening and closing operations of the door. The excess length portion is drawn out from the space when the door is opened. The excess length portion is drawn along an arcuate outer periphery of a speaker disposed in the space to be contained in the space when the door is closed.

2 Claims, 9 Drawing Sheets

U.S. PATENT DOCUMENTS

| | | | |
|---|---|---|---|
| 5,884,961 A * | 3/1999 | Serizawa et al. | 296/146.7 |
| 5,897,157 A * | 4/1999 | Yamaguchi et al. | 296/146.7 |
| 5,994,645 A * | 11/1999 | Suzuki et al. | 174/72 A |
| 6,070,931 A * | 6/2000 | Yamaguchi et al. | 296/146.7 |
| 6,079,764 A * | 6/2000 | Suzuki et al. | 296/146.1 |
| 6,217,375 B1 * | 4/2001 | Nagai et al. | 439/501 |
| 6,536,835 B2 * | 3/2003 | Murakami et al. | 296/152 |
| 6,700,064 B2 * | 3/2004 | Aoki et al. | 174/69 |
| 7,202,415 B2 * | 4/2007 | Fujita | 174/72 A |
| 7,227,969 B2 * | 6/2007 | Maekawa et al. | 381/345 |
| 7,615,713 B2 * | 11/2009 | Bardella et al. | 174/650 |
| 7,833,567 B2 * | 11/2010 | Ohashi et al. | 427/8 |
| 8,020,920 B2 * | 9/2011 | Toyozumi et al. | 296/146.7 |
| 2002/0112320 A1 * | 8/2002 | Hayashi | 16/386 |
| 2003/0011209 A1 * | 1/2003 | Berta et al. | 296/146.7 |
| 2005/0148212 A1 | 7/2005 | Ojima et al. | |
| 2006/0090920 A1 | 5/2006 | Fujita | |
| 2010/0283288 A1 * | 11/2010 | Toyozumi et al. | 296/146.9 |

FOREIGN PATENT DOCUMENTS

| | | |
|---|---|---|
| JP | 08033166 A * | 2/1996 |
| JP | 8-58491 | 3/1996 |
| JP | 09020189 A * | 1/1997 |
| JP | 9-48241 | 2/1997 |
| JP | 09048296 A * | 2/1997 |
| JP | 09219915 A * | 8/1997 |
| JP | 09240390 A * | 9/1997 |
| JP | 10-934 | 1/1998 |
| JP | 10006879 A * | 1/1998 |
| JP | 10016670 A * | 1/1998 |
| JP | 10-53077 | 2/1998 |
| JP | 11105642 A * | 4/1999 |
| JP | 11189110 A * | 7/1999 |
| JP | 2000-16194 | 1/2000 |
| JP | 2002274288 A * | 9/2002 |
| JP | 2004106606 A * | 4/2004 |
| JP | 2006-117054 | 5/2006 |
| JP | 2007076620 A * | 3/2007 |
| JP | 2007076622 A * | 3/2007 |
| JP | 2007076623 A * | 3/2007 |
| JP | 2008143325 A * | 6/2008 |
| JP | 2008195182 A * | 8/2008 |
| JP | 2009056911 A * | 3/2009 |
| WO | WO 2008099541 A1 * | 8/2008 |

OTHER PUBLICATIONS

English language Abstract of JP 10-53077, Feb. 24, 1998.
English language Abstract of JP 2000-16194, Jan. 18, 2000.
English language Abstract of JP 10-934, Jan. 6, 1998.
English language Abstract of JP 8-58491, Mar. 5, 1996.
English language Abstract of JP 9-48241, Feb. 18, 1997.
U.S. Appl. No. 12/517,681 to Toyozumi et al., which was filed on Jun. 4, 2009.

* cited by examiner

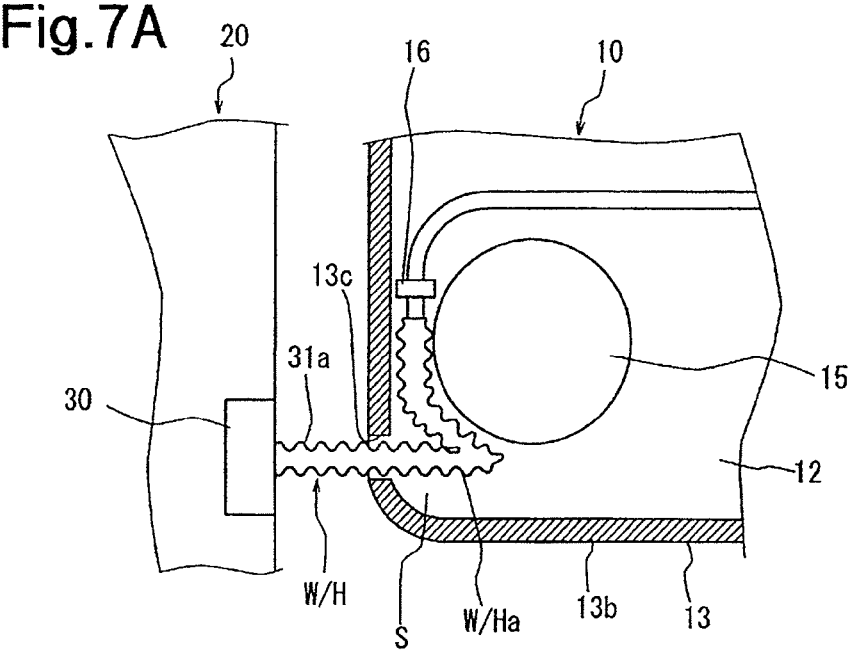
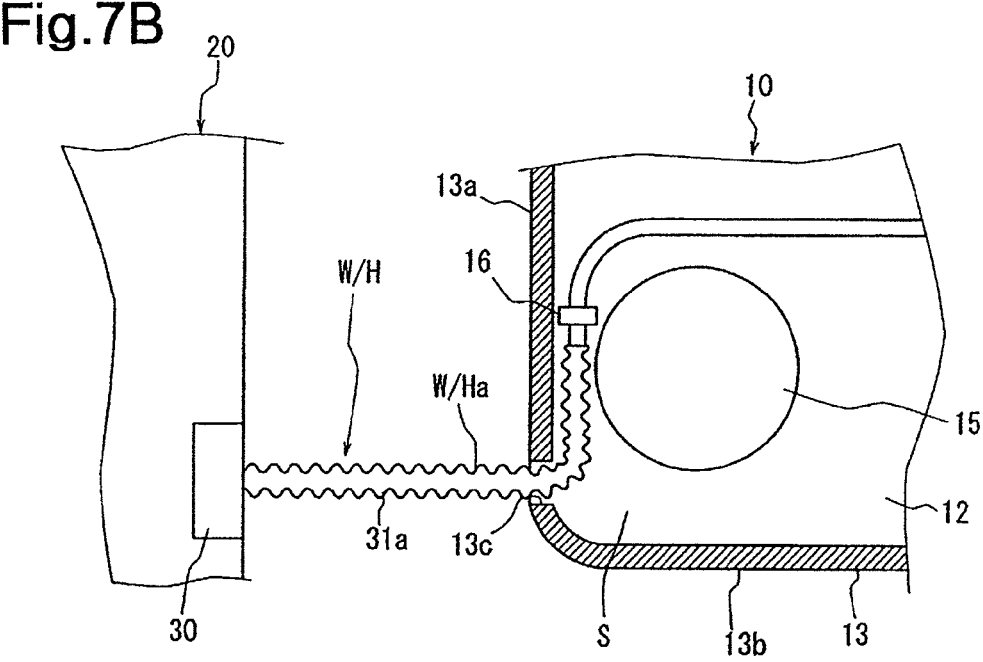

ARRANGING STRUCTURE OF WIRE HARNESS FOR DOOR

FIELD OF THE INVENTION

This invention relates to an arranging structure of a wire harness for a door. The wire harness for the door is spanned between a vehicle body and a door of a motor vehicle. The wire harness is extendably arranged in the door in connection with opening and closing operations of the door.

BACKGROUND OF THE INVENTION

Before, in the case where electrical components are installed in a side door of a motor vehicle, a wire harness for a door that is arranged in the side door and is drawn into a vehicle body side is arranged in a space between a door outer panel and a door inner panel. As shown in FIG. 9, opposite ends of the wire harness are spanned between a door 1 and a vehicle body 2 so that one end of the wire harness is inserted into a through-hole 1b provided in a vehicle body side end wall of an inner panel 1a of the door 1 and the other end is inserted into a grommet 3 fitted in a through-hole 2b provided in an outer panel 2a of the vehicle body 2.

A job of inserting the wire harness into the through-holes 1b and 2b is a hard task. Also, a job of connecting connectors on opposite ends of the wire harness to many electrical components installed in a space between the outer panel and the inner panel in an assembling line of a motor vehicle requires a worker to keep an unnatural posture for a long time. This will become a burden to a worker and will lower efficiency in working.

Since the wire harness is arranged near a rotary axle of a hinge H between the vehicle body 2 and the door 1 in the above arranging structure, the wire harness is subject to only bending and twisting actions and is not subject to stretching and compressing actions when the door 1 is opened and closed. However, since the through-hole 1b in the inner panel 1a of the door 1 is disposed at an outdoor side from a weather strip 4, it is necessary to provide a waterproofing structure on a portion for spanning the wire harness.

In order to overcome the above problem, as shown in FIG. 10, the present applicant has disclosed an arranging structure of a wire harness in JP HEI 10 (1998)-934. In this arranging structure of the wire harness, an inner panel 1a of a door 1 is provided on a vehicle side surface with a substantially triangular space 1c. A wire harness W/H is provided with an excess length portion that can follow opening and closing operations of the door. The excess length portion is contained in the triangular space 1c and is drawn out from an outlet in the triangular space 1c to a vehicle side.

According to the above construction, the wire harness W/H is drawn out from the triangular space 1c when the door 1 is opened, and the excess length portion of the wire harness W/H is contained in the triangular space 1c when the door 1 is closed. Thus, the wire harness W/H can follow the opening and closing operations of the door 1. Furthermore, since the wire harness W/H is arranged at an indoor side from a weather strip 4, it is not necessary to provide a waterproofing structure.

However, it is necessary to perform a desired work on the inner panel 1a in order to provide the triangular space 1c for containing the excess length portion. This will increase producing steps and costs. There still remains a problem to be improved.

SUMMARY OF THE INVENTION

Problem to be Solved by the Invention

In view of the above problems, an object of the present invention is to provide an arranging structure of a wire harness for a door wherein the wire harness for the door can be stretched and compressed in connection with opening and closing operations of the door without providing a structure for containing an excess length portion of the wire harness for the door in a door inner panel.

Means for Solving the Problem

In order to achieve the above object, a first invention is directed to an arranging structure of a wire harness for a door, the wire harness being spanned between a door of a motor vehicle and a vehicle body at an indoor side inside of a weather strip. The wire harness for the door is arranged in a space between a door inner panel and a door trim at a door side and is provided with an excess length portion that follows opening and closing operations of the door. A vehicle body facing wall of the door trim is provided at a position opposing to a speaker with a wire harness outlet elongated in a vertical direction, and the wire harness for the door is drawn out from the wire harness outlet to be extended to a vehicle body side. The wire harness is locked on the door inner panel at a lower or upper position of the speaker, and a space at an arcuate outer periphery of a speaker from the locked position to a side portion approaching to the vehicle body facing wall of the door trim defines a containing space for the excess length portion. The wire harness for the door is moved to a direction departing from the arcuate outer periphery of the speaker and is drawn out from the wire harness outlet when the door is opened, and the wire harness for the door is drawn into along the arcuate outer periphery of the speaker when the door is closed.

According to the arranging structure of the wire harness for the door in accordance with the present invention, the excess length portion of the wire harness is contained in the empty space around the periphery of the speaker disposed in the space between the door inner panel and the door trim covering the door inner panel. Consequently, it is not necessary to provide an additional space or an additional member for containing the excess length portion in the door inner panel, thereby enabling reduction of steps and costs in production.

Also, since the wire harness is bent along the arcuate outer periphery of the speaker when the door is closed, it is easy to arrange the wire harness and to permit the wire harness to smoothly follow the opening and closing operations of the door. The wire harness will not be damaged on account of interference with the speaker.

Furthermore, if the grommet sheathes the wire harness drawn out from the door side and is disposed below a door checker by a distance of about 50 to 100 mm (millimeters), the door checker blocks and protects the grommet, thereby preventing vehicle occupants from contacting with the grommet.

The wire harness is arranged between a vehicle body facing wall of the door trim and the speaker. The wire harness is locked on the door inner panel at a position between the vehicle body facing wall of the door trim and the speaker, or at a position of a lower or upper area of the speaker. The wire harness is drawn out from a wire harness outlet provided in the vehicle body facing wall of the door trim to be extended to a vehicle side.

According to the above construction, since the wire harness for the door is arranged on the space that is defined between the vehicle body facing wall of the door trim and the speaker and that contains no element originally, it is possible to effectively utilize a space and it is not necessary to alter arranging positions and constructions of the other elements.

The wire harness for the door is locked on the door inner panel at a lower or upper position of the speaker. The wire harness for the door is arranged along an outer periphery of the speaker from the locked position to a side portion approaching to the vehicle body facing wall of the door trim when the door is closed. The wire harness for the door is moved in a direction away from the outer periphery of the speaker to draw the excess length portion from the space when the door is opened.

A second invention is directed to an arranging structure of a wire harness for a door, the wire harness being spanned between a door of a motor vehicle and a vehicle body at an indoor side inside of a weather strip. The wire harness for the door is drawn out from a space between a door inner panel and a door trim at a door side and is provided with an excess length portion that follows opening and closing operations of the door. A vehicle body facing wall of the door trim is provided with a wire harness outlet in an upper or lower area at a position opposing to a speaker. The wire harness for the door is drawn out from the wire harness outlet to be extended to a vehicle body side. The wire harness for the door is locked on the door inner panel between the vehicle, body facing wall of the door trim and the speaker. The wire harness for the door is arranged along an outer periphery of the speaker from the locked position to an upper or lower area of the speaker and is bent from the upper or lower area of the speaker to the vehicle body side when the door is closed. A space between the speaker and the vehicle body facing wall of the door trim and a space at an upper or lower side of the speaker define a containing space for the excess length portion. The wire harness for the door is moved in a direction away from the outer periphery of the speaker to draw the excess length portion from the containing space when the door is opened.

The wire harness of the door may be arranged along the vehicle body facing wall of the door trim and/or along a bottom wall contiguous with the vehicle body facing wall.

According to the above construction, since the wire harness for the door is arranged on the empty space near the vehicle body facing wall and/or near the bottom wall contiguous with the facing wall, it is not necessary to provide a space for containing the wire harness or additional members on the door inner panel, thereby enabling reduction of steps and costs in production.

Effects of the Invention

As described above, according to the present invention, the wire harness for the door is contained in an empty space around the periphery of the speaker disposed in a space between the door inner panel and the door trim or an empty space near the vehicle body facing wall and/or the bottom wall of the door trim. Consequently, it is not necessary to provide an additional space or an additional member for containing the wire harness in the door inner panel, thereby enabling reduction of steps and costs in production. Also, since the empty space around the periphery of the speaker or the like is utilized, it is not necessary to alter arranging positions and constructions of the other elements.

Also, in the case where the wire harness is bent along the arcuate outer periphery of the speaker when the door is closed, it is easy to arrange the wire harness and to permit the wire harness to smoothly follow the opening and closing operations of the door. The wire harness will not be damaged on account of interference with the speaker.

BRIEF DESCRIPTION OF THE DRAWINGS

FIG. 7A is a sectional view of a first alteration of the second embodiment shown in FIG. 6A, illustrating the door in the closed position. FIG. 7B is a sectional view of the first alteration of the second embodiment shown in FIG. 6B, illustrating the door in the opened position.

Figure 1:
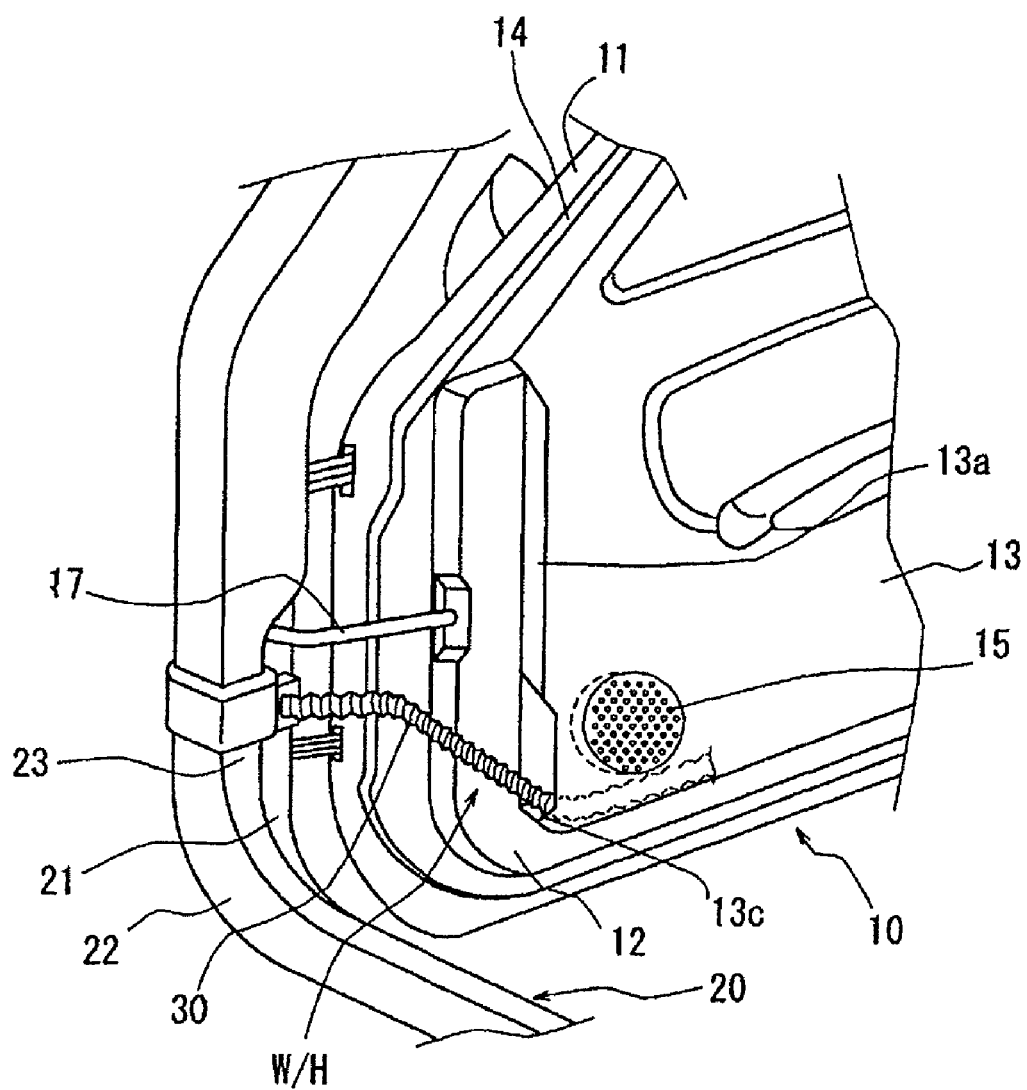
FIG. 1 is a perspective view of a first embodiment of an arranging structure of a wire harness for a door in accordance with the present invention.

EXPLANATION OF SIGNS 10 door
11 door outer panel
12 door inner panel
14 weather strip
20 vehicle body
21 vehicle body outer panel
22 vehicle body inner panel
23 flange
30 grommet
W/H wire harness
W/Ha excess length portion

DETAILED DESCRIPTION OF THE INVENTION

Referring now to the drawings, embodiments of an arranging structure of a wire harness for a door in accordance with the present invention will be described below.

Figure 2A:
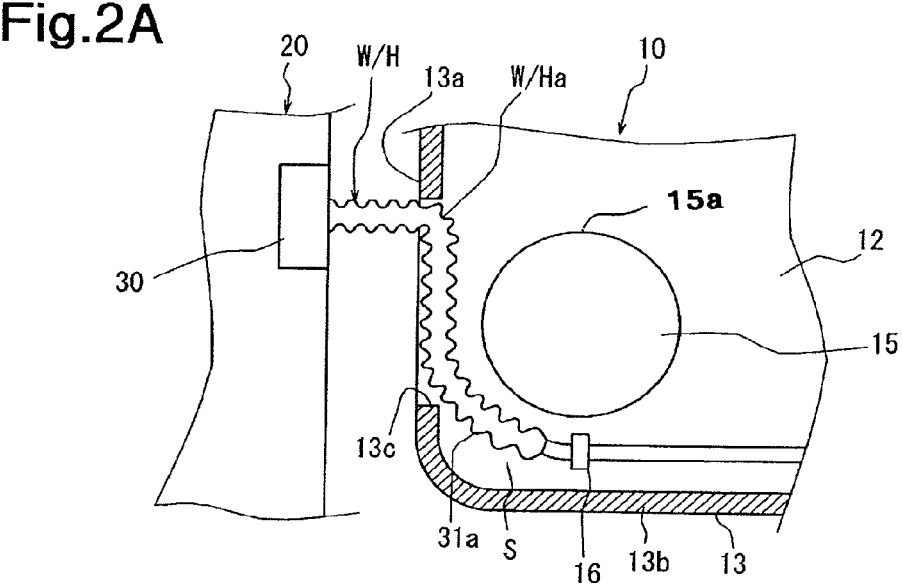
FIG. 2A is a sectional view of the arranging structure of the wire harness shown in FIG. 1, illustrating the door in a closed position.
Figure 2B:
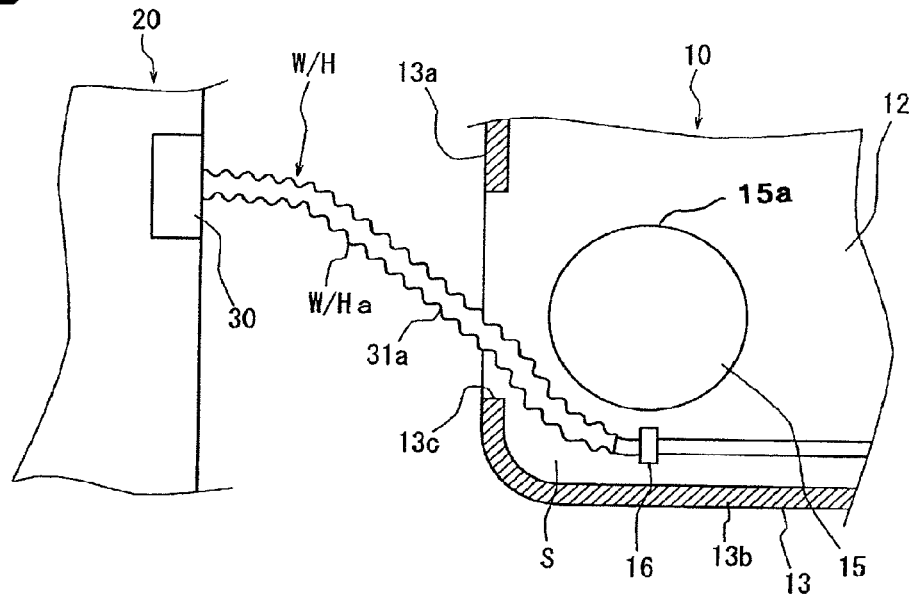
FIG. 2B is a similar view to FIG. 2A, illustrating the door in an opened position.
Figure 3:
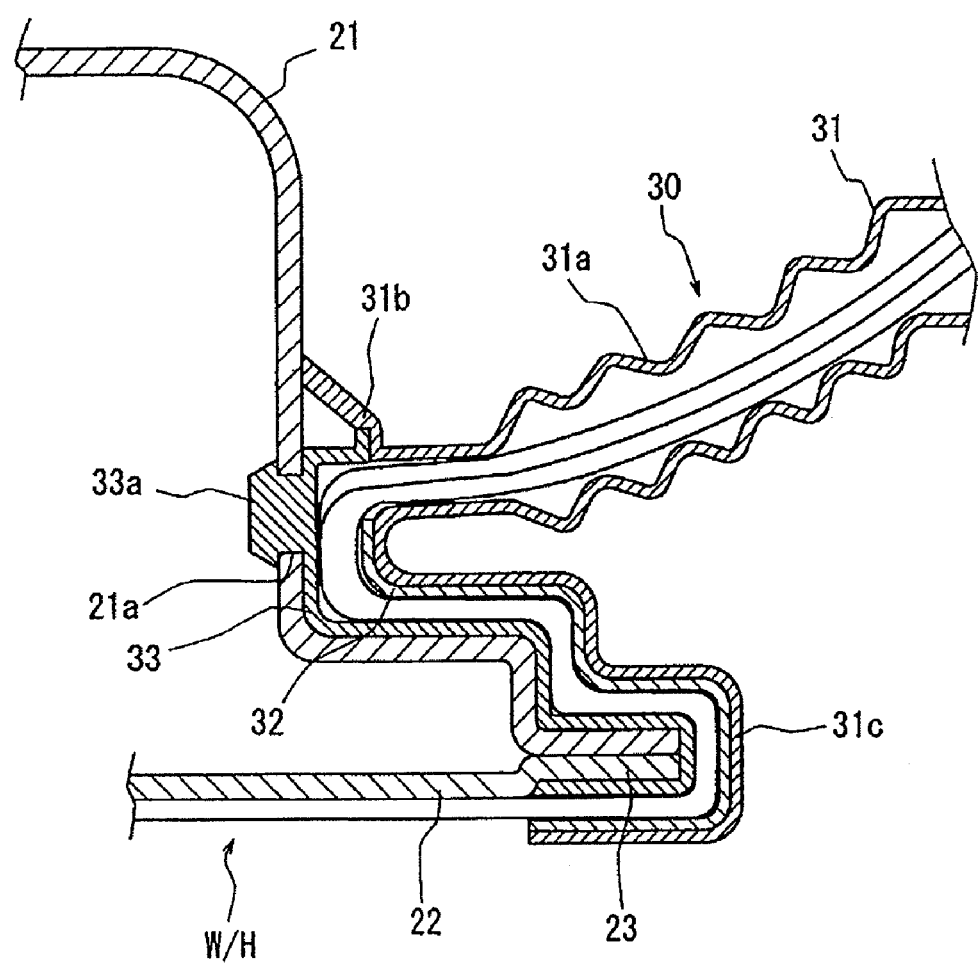
FIG. 3 is a sectional view of an arranging path of the wire harness in a vehicle body side.

FIGS. 1 to 3 show a first embodiment of an arranging structure of a wire harness for a door in accordance with the present invention. A wire harness for a door W/H (hereinafter referred to a "wire harness W/H") is arranged in a side door 10 of a motor vehicle and is extended to a vehicle body 20. A grommet 30 sheathes a portion of the wire harness W/H spanned between the side door 10 and the vehicle body 20.

In more detail, as shown in FIG. 1, the wire harness W/H arranged in the side door 10 (hereinafter referred to a "door 10") is drawn out from a space between a door inner panel 12 connected to a door outer panel 11 and a door trim 13 covering an indoor side of the door inner panel 12. As shown in FIGS. 2A and 2B, a speaker 15 having an arcuate outer periphery 15a is disposed on a corner position in a space between the door inner panel 12 and the door trim 13. The corner position is spaced apart from a vehicle body facing wall 13a and a bottom wall 13b of the door trim 13 by a given distance S. A clamp 16 fixed to the wire harness W/H by means of tape-winding or band-winding is attached to the door inner panel 12 below the speaker 15. The vehicle body facing wall 13a of the door trim 13 is provided at a position opposed to the speaker 15 with a wire harness outlet 13c elongated in a vertical direction. The wire harness W/H is extended through the wire harness outlet 13c to the vehicle body 20.

The wire harness W/H drawn out from the wire harness outlet 13c is spanned between the door 10 and the vehicle body 20 at the indoor side nearer than the weather strip 14 provided on the door 14. In the first embodiment, the wire harness W/H is disposed downward by about 80 mm (millimeters) at a position below a door checker 17 coupled between the door 10 and the vehicle body 20. As shown in FIG. 3, in the vehicle body 20, the wire harness W/H inserted in a grommet 30 passes over a flange 23 joining a vehicle body outer panel 21 and a vehicle body inner panel 22 of the vehicle body 20, is arranged along an interior of the vehicle body inner panel 22, and is connected through a connector (not shown) to a wire harness (not shown) arranged in the vehicle body 20.

The grommet 30 that sheathes the spanned portion of the wire harness W/H includes a grommet body 31 made of rubber or elastomer and, a cover member 32 and a body member 33 made of resin molding products and attached to a vehicle body side end of the grommet body 31.

As shown in FIG. 3, the grommet body 31 includes a bellows-like cylindrical portion 31a through which the wire harness W/H spanned between the door 10 and the vehicle body 20 passes, an outer panel contact portion 31b that encloses a vehicle body side opening of the cylindrical portion 31a and contacts with a vehicle body outer panel 21 at an outdoor side from a flange projecting position of the vehicle body 20, and a flange covering portion 31c bent in a U-shaped configuration in cross section from the side of the flange 23 of the outer panel contact portion 31b.

The cover member 32 is installed in the grommet body 31 and is laminated on inner surfaces of the outer panel contact portion 31b and flange covering portion 31c. The body member 33 is formed into a configuration in parallel to the cover member 32 and is provided on an outer surface with an engaging clip 33a to be inserted into and engaged with a receiving aperture 21a in the vehicle body outer panel 21.

As shown in FIG. 3, the outer panel contact portion 31b and flange covering portion 31c of the grommet body 31 sheathe the cover member 32 and body member 33 locked to each other. The wire harness W/H inserted in the cylindrical portion 31a of the grommet body 31 passes through a wire harness threading space between the cover member 32 and the body member 33 and is drawn out from an end at a flange covering portion side. Under this condition, the engaging clip 33a of the body member 33 is inserted into and engaged with the receiving aperture 21a in the vehicle body outer panel 21, the flange covering portion of the grommet 30 covers the flange 23, and the grommet 30 is secured to the vehicle body panel.

When the door 10 is in a closed position, as shown in FIG. 2A, the wire harness W/H is arranged from the locked position by the clamp 16 along the outer periphery 15a of the speaker 15 to a side approaching the vehicle body facing wall 13a of the door trim 13, is further arranged upward, and is drawn out from an upper end position of the wire harness outlet 13c. At this time, an excess length portion W/Ha of the wire harness W/H is contained in a space between the door inner panel 12 and the door trim 13.

On the other hand, as shown in FIG. 2B, when the door 10 is being opened, the wire harness W/H arranged along the outer periphery 15a of the speaker 15 is moved in a direction away from the outer periphery 15a of the speaker 15 so that the excess length portion W/Ha of the wire harness W/H is drawn out from the space between the door inner panel 12 and the door trim 13. When the door is opened completely, the wire harness W/H is drawn out from a lower end position of the wire harness outlet 13c.

Thus, the wire harness W/H spanned between the door 10 and the vehicle body 20 can be stretched and compressed in connection with opening and closing operations of the door 10.

According to the above construction, the excess length portion W/Ha of the wire harness W/H is contained in the empty space along the speaker 15 disposed in the space between the door inner panel 12 and the door trim 13. Consequently, it is not necessary to provide an additional space or an additional member for containing the excess length portion W/Ha in the door inner panel 12, thereby reducing steps and costs in production. Also, since an empty space S along the speaker 15 can be effectively utilized, it not necessary to alter arranging positions and constructions of the other members.

Also, since the wire harness W/H is bent along the arcuate outer periphery 15a of the speaker 15 when the door 10 is closed, it is easy to arrange the wire harness W/H and to permit the wire harness W/H to smoothly follow the opening and closing operations of the door 10. The wire harness W/H will not be damaged on account of interference with the speaker 15.

Figure 4A:
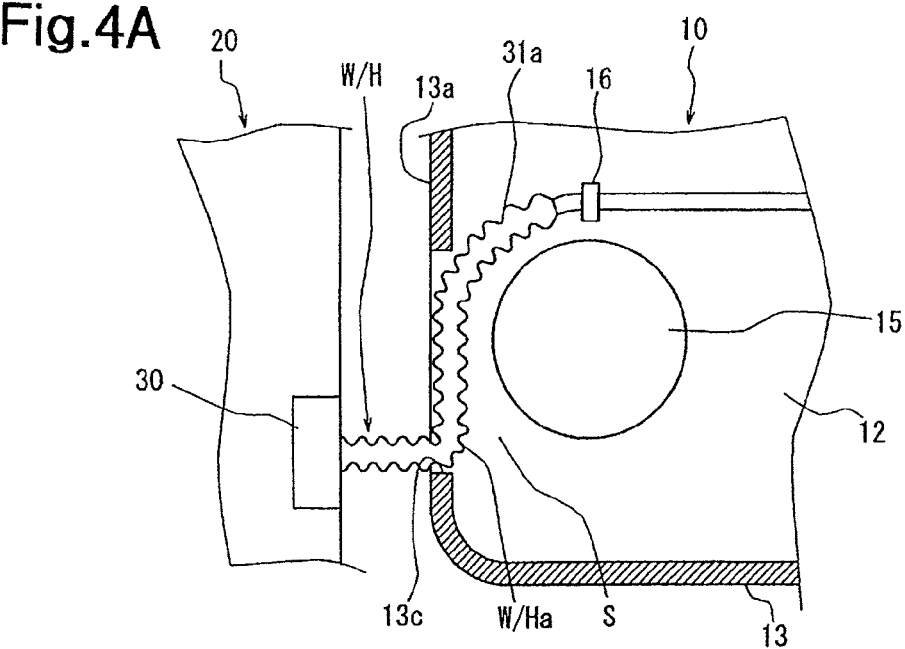
FIG. 4A is a sectional view of a first alteration of the first embodiment shown in FIG. 2A, illustrating the door in the closed position.
Figure 4B:
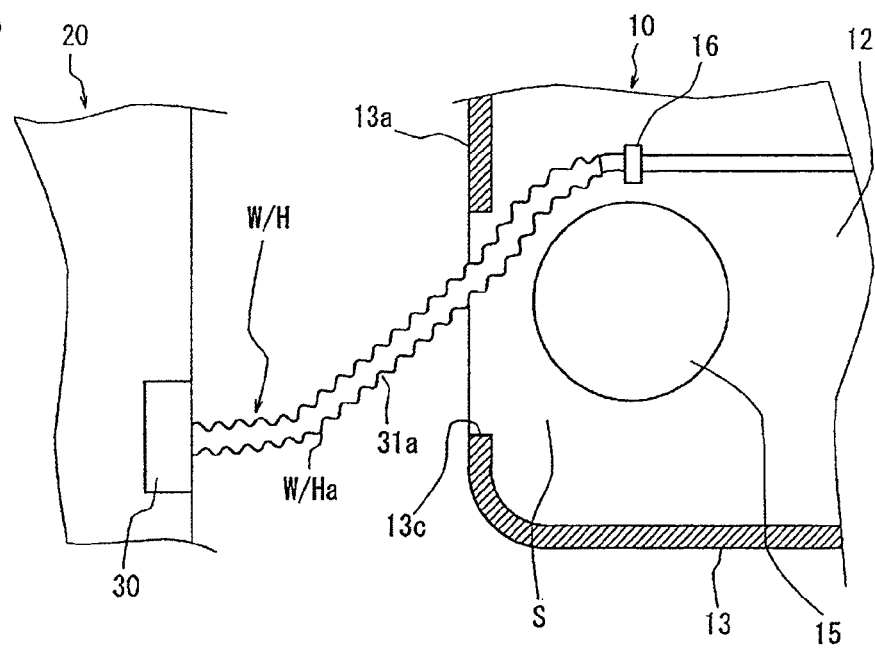
FIG. 4B is a sectional view of a first alteration of the first embodiment shown in FIG. 2B, illustrating the door in the opened position.

FIGS. 4A and 4B show a first alteration of the first embodiment of the present invention.

In the first alteration, the wire harness W/H is locked by the clamp 16 at a position above the speaker 15 on the door inner panel 12 and the excess length portion W/Ha of the wire harness W/H is arranged along the arcuate outer periphery 15a of the speaker 15.

Since the other constructions and operational effects in the first alteration are the same as those in the first embodiment, their explanations are omitted by giving the same designators to the same elements.

Figure 5A:
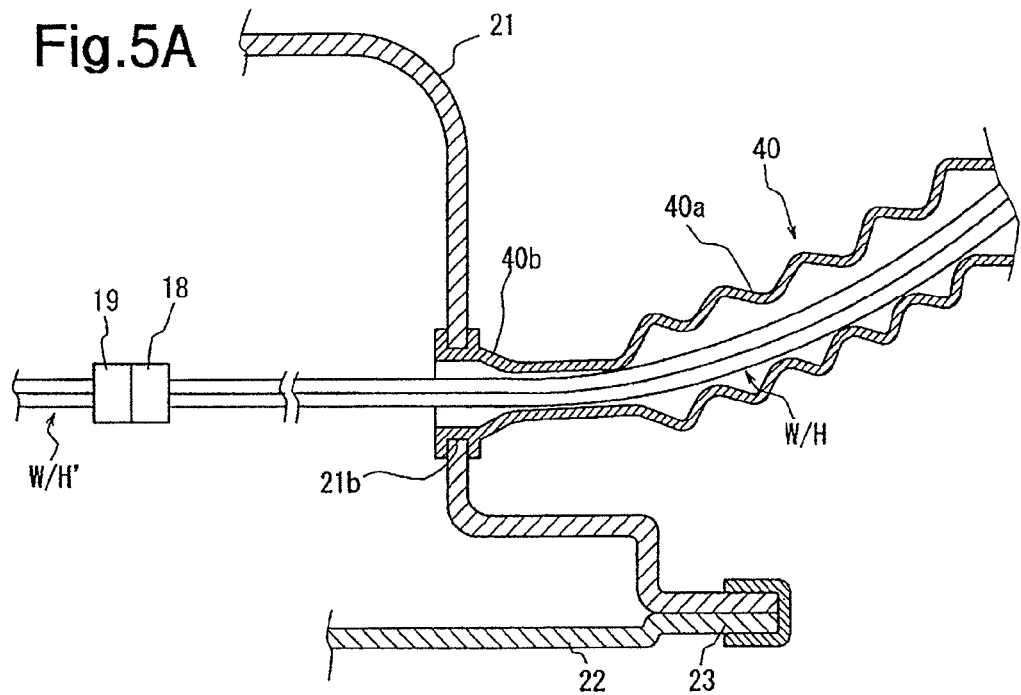
FIG. 5A is a sectional view of a second alteration of the first embodiment shown in FIG. 3.

FIG. 5A shows a second alteration of the first embodiment of the present invention.

The wire harness W/H drawn out from the door 10 is inserted into a through-hole 21b provided in the vehicle body outer panel 21 of the vehicle body 20 without permitting the wire harness W/H to pass over the flange 23 that interconnects the vehicle body outer panel 21 and the vehicle body inner panel 22 to each other.

That is, in the second alteration, the grommet 40 includes a bellows-like cylindrical portion 40a and a vehicle body engaging cylindrical portion 40b provided on a vehicle body side end of the cylindrical portion 40a. As shown in FIG. 5A, the vehicle body engaging cylindrical portion 40b is fitted on a peripheral part around the through-hole 21b. The wire harness W/H inserted in the grommet 40 is inserted into the through-hole 21b and is arranged in a space between the vehicle body outer panel 21 and the vehicle body inner panel 22. In this space, a connector 18 connected to an end of the door side wire harness W/H is coupled to a connector 19 connected to an end of a vehicle body side wire harness W/H' to interconnect the door side wire harness W/H and the vehicle body side wire harness W/H' to each other.

Figure 5B:
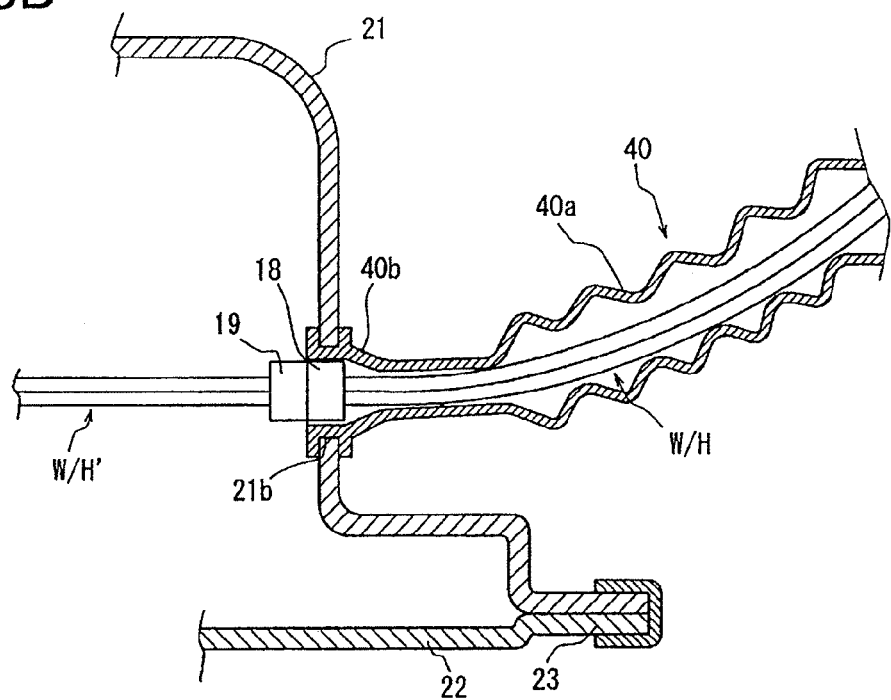
FIG. 5B is a sectional view of a third alteration of the first embodiment shown in FIG. 3.

FIG. 5B shows a third alteration of the first embodiment of the present invention. The connector 19 connected to the end of the vehicle body side wire harness W/H' is disposed adjacent the through-hole 21b in the vehicle body outer panel 21 to serve as a standby connector. The door side wire harness W/H may be connected to the vehicle body side wire harness W/H' without drawing the door side wire harness W/H into the space between the vehicle body outer panel 21 and the vehicle body inner panel 22.

Figure 6A:
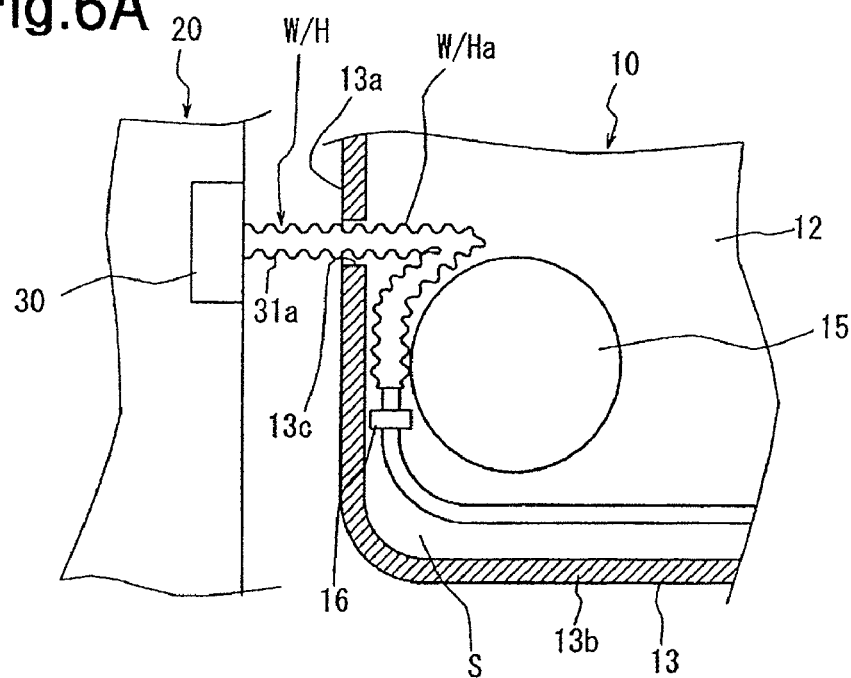
FIG. 6A is a sectional view of a second embodiment of the arranging structure of the wire harness for the door in accordance with the present invention, illustrating the door in the closed position.
Figure 6B:
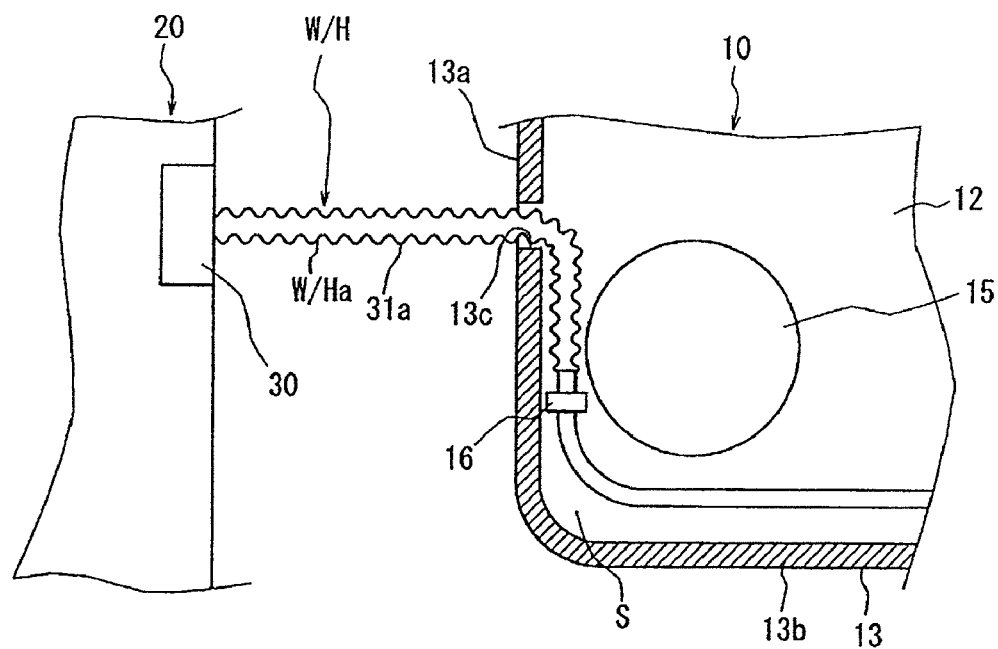
FIG. 6B is a similar view to FIG. 6A, illustrating the door in the opened position.

FIGS. 6A and 6B show a second embodiment of the present invention.

In the second embodiment, the door side wire harness W/H is locked on the inner panel 12 by the clamp 16 between the vehicle body facing wall 13a of the door trim 13 and the speaker 15.

As shown in FIG. 6A, when the door 10 is closed, the wire harness W/H is arranged from the position locked by the clamp 16 along the speaker outer periphery 15a to an upper part of the speaker 15, is bent toward the vehicle body 20 at the upper part of the speaker 15, and is drawn out from the wire harness outlet 13c.

On the other hand, as shown in FIG. 6B, when the door 10 is being opened, the wire harness W/H departs from the speaker outer periphery 15a and the excess length portion W/Ha is drawn out from the space.

In the second embodiment, the wire harness outlet 13c provided in the vehicle body facing wall 13a of the door trim 13 constrains a position of drawing the wire harness W/H without extending the outlet 13c in the vertical direction as is the case with the first embodiment. A position in height of the wire harness outlet 13c is set to be the same position in height of the wire harness W/H bent at the upper part of the speaker 15.

According to the above construction, as is the case with the first embodiment, the excess length portion W/Ha of the wire harness W/H is contained in the empty space along the speaker 15. Consequently, it is not necessary to provide an additional space or an additional member and it is not necessary to alter arranging positions and constructions of the other elements.

Also, since the wire harness W/H is bent along the arcuate outer periphery 15a of the speaker 15, it is easy to arrange the wire harness W/H and to permit the wire harness W/H to smoothly follow the opening and closing operations of the door 10.

Since the other constructions and operational effects in the second embodiment are the same as those in the first embodiment, their explanations are omitted by giving the same designators to the same elements.

FIGS. 7A and 7B show a first alteration of the second embodiment of the present invention.

The position of the wire harness W/H locked on the door inner panel 12 by the clamp 16 in the first alteration of the second embodiment is substantially the same position in the second embodiment. However, a first part of the wire harness W/H arranged downward along the outer periphery of the speaker 15 from the locked position is drawn out from the wire harness outlet 13c, and is spanned onto the vehicle body 20. A second part of the wire harness W/H arranged upward along the outer periphery of the speaker 15 is arranged in the door 10 to be connected to desired electrical components. FIG. 7A shows the door 10 in the closed position while FIG. 7B shows the door 10 in the opened position.

Figure 8A:
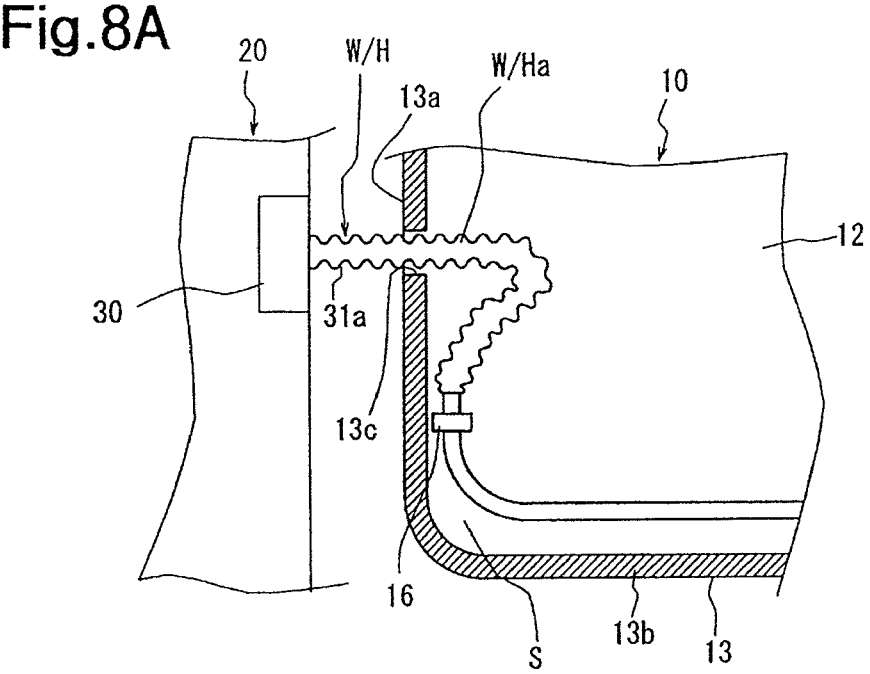
FIG. 8A is a sectional view of a reference embodiment of the arranging structure of the wire harness for the door in accordance with the present invention, illustrating the door in the closed position.
Figure 8B:
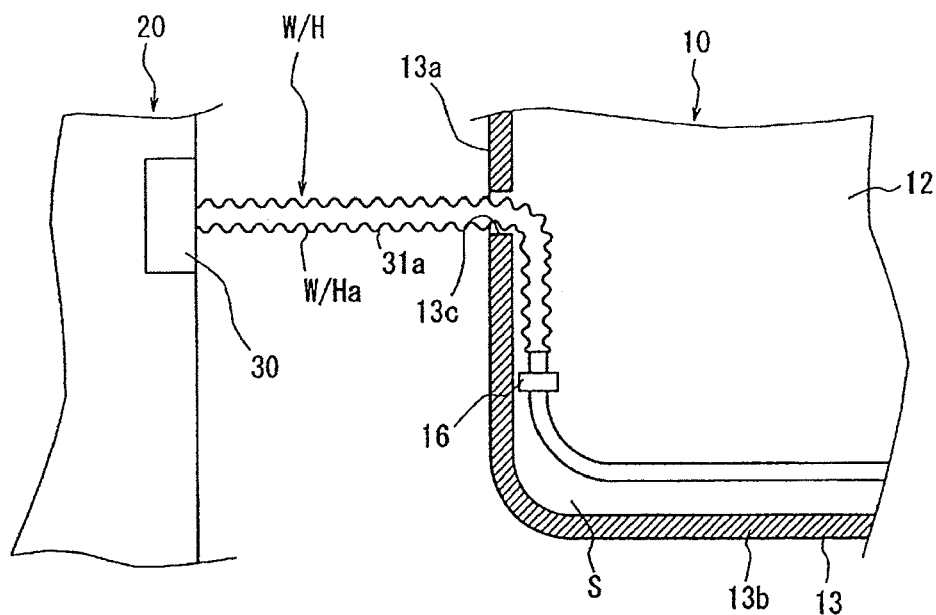
FIG. 8B is a similar view to FIG. 8A, illustrating the door in the opened position.
Figure 9:
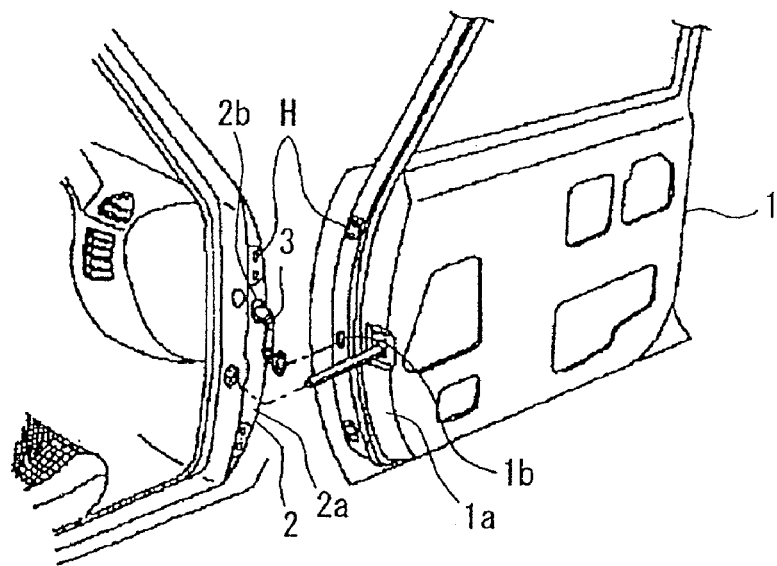
FIG. 9 is a perspective view of a prior art side door of a motor vehicle.
Figure 10:
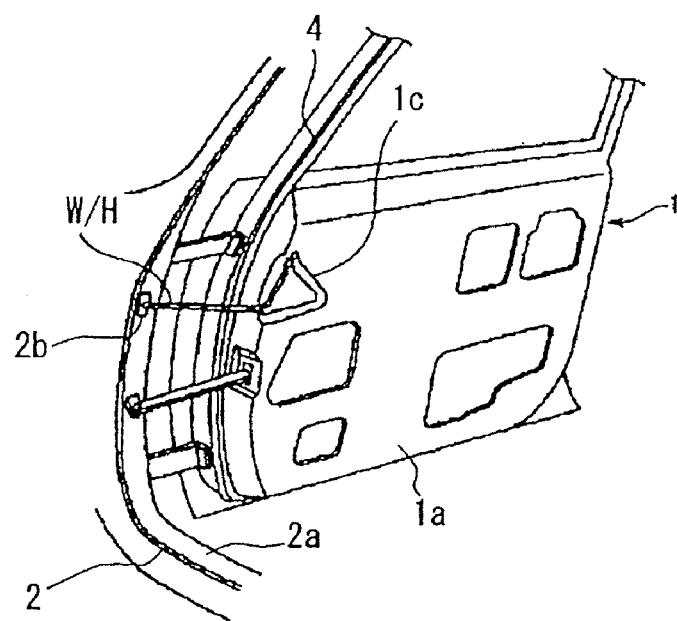
FIG. 10 is a perspective view of another prior art side door of a motor vehicle.

FIGS. 8A and 8B show a third embodiment of the present invention.

The door side wire harness W/H in the third embodiment is disposed on the substantially same positions in the first and second embodiments. However, the door side wire harness W/H is arranged along the vehicle body facing wall 13a and the bottom wall 13b contiguous with the facing wall 13a without arranging the wire harness W/H along the outer periphery of a speaker. FIG. 8A shows the door 10 in the closed position while FIG. 8B shows the door 10 in the opened position.

That is, when the door 10 is being opened, the excess length portion W/Ha is drawn into the space S, the wire harness W/H is arranged along the vehicle body facing wall 13a and the bottom wall 13b contiguous with the facing wall 13a.

According to the above construction, the wire harness W/H is contained in the empty space near the vehicle body facing wall 13a of the door trim 13 and the bottom wall 13b contiguous with the facing wall 13a. Consequently, it is not necessary to provide an additional space or an additional member for containing the wire harness W/H In the door inner panel 12, thereby reducing steps and costs in production.

Since the other constructions and operational effects in the reference embodiment are the same as those in the first embodiment, their explanations are omitted by giving the same designators to the same elements.

The invention claimed is:

1. An arranging structure of a wire harness for a door, said wire harness being spanned between a door of a motor vehicle and a vehicle body at an indoor side inside of a weather strip;
    wherein said wire harness for the door is arranged in a space between a door inner panel and a door trim at a door side and is provided with an excess length portion that follows opening and closing operations of the door;
    wherein a vehicle body facing wall of said door trim is provided at a position opposing to a speaker with a wire harness outlet elongated in a vertical direction, and said wire harness for the door is drawn out from said wire harness outlet to be extended to a vehicle body side;
    wherein said wire harness is locked on said door inner panel at a lower or upper position of said speaker, and a space at an arcuate outer periphery of a speaker from said locked position to a side portion approaching to said vehicle body facing wall of said door trim defines a containing space for said excess length portion; and
    wherein said wire harness for the door is moved in a direction away from the arcuate outer periphery of said speaker and is drawn out from said wire harness outlet when the door is opened, and said wire harness for the door is drawn into along the arcuate outer periphery of said speaker when the door is closed.

2. An arranging structure of a wire harness for a door, the wire harness being spanned between a door of a motor vehicle and a vehicle body at an indoor side inside of a weather strip;
    wherein the wire harness for the door is drawn out from a space between a door inner panel and a door trim at a door side and is provided with an excess length portion that follows opening and closing operations of the door;
    wherein a vehicle body facing wall of the door trim is provided with a wire harness outlet in an upper or lower area at a position opposing to a speaker, and the wire harness for the door is drawn out from the wire harness outlet to be extended to a vehicle body side;

wherein the wire harness for the door is locked on the door inner panel between the vehicle body facing wall of said door trim and the speaker;

wherein the wire harness for the door is arranged along an outer periphery of the speaker from the locked position to an upper or lower area of the speaker and is bent from the upper or lower area of the speaker to the vehicle body side when the door is closed, and a space between said speaker and the vehicle body facing wall of said door trim and a space at an upper or lower side of said speaker define a containing space for the excess length portion; and wherein said wire harness for the door is moved in a direction away from the outer periphery of said speaker to draw said excess length portion from said containing space when the door is opened.

* * * * *